Jan. 11, 1966   J. L. GROSH   3,228,616
APPARATUS FOR CHANGING A HELICAL WINDING ANGLE
Filed Dec. 26, 1962   2 Sheets-Sheet 1
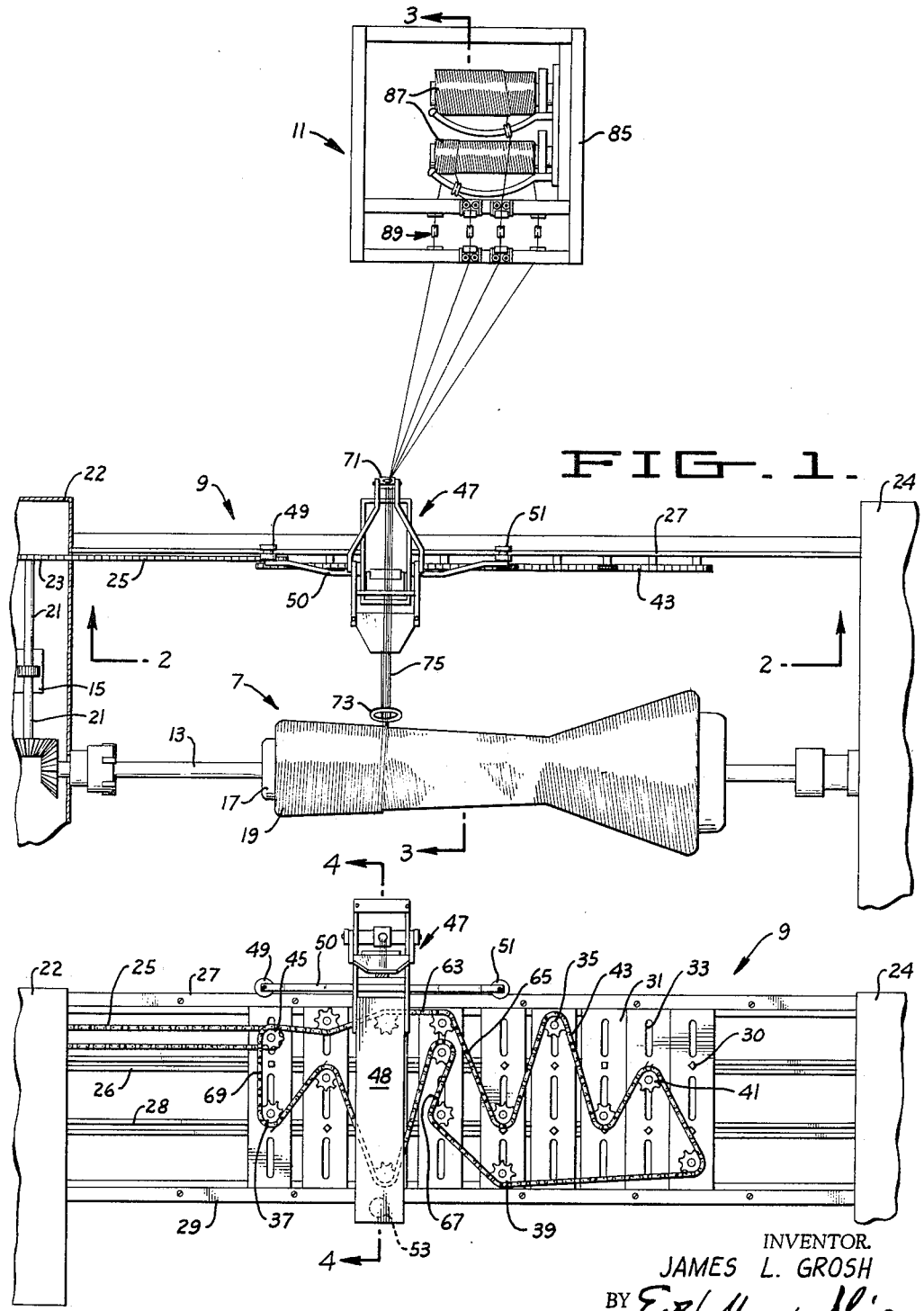
INVENTOR.
JAMES L. GROSH
BY
ATTORNEYS

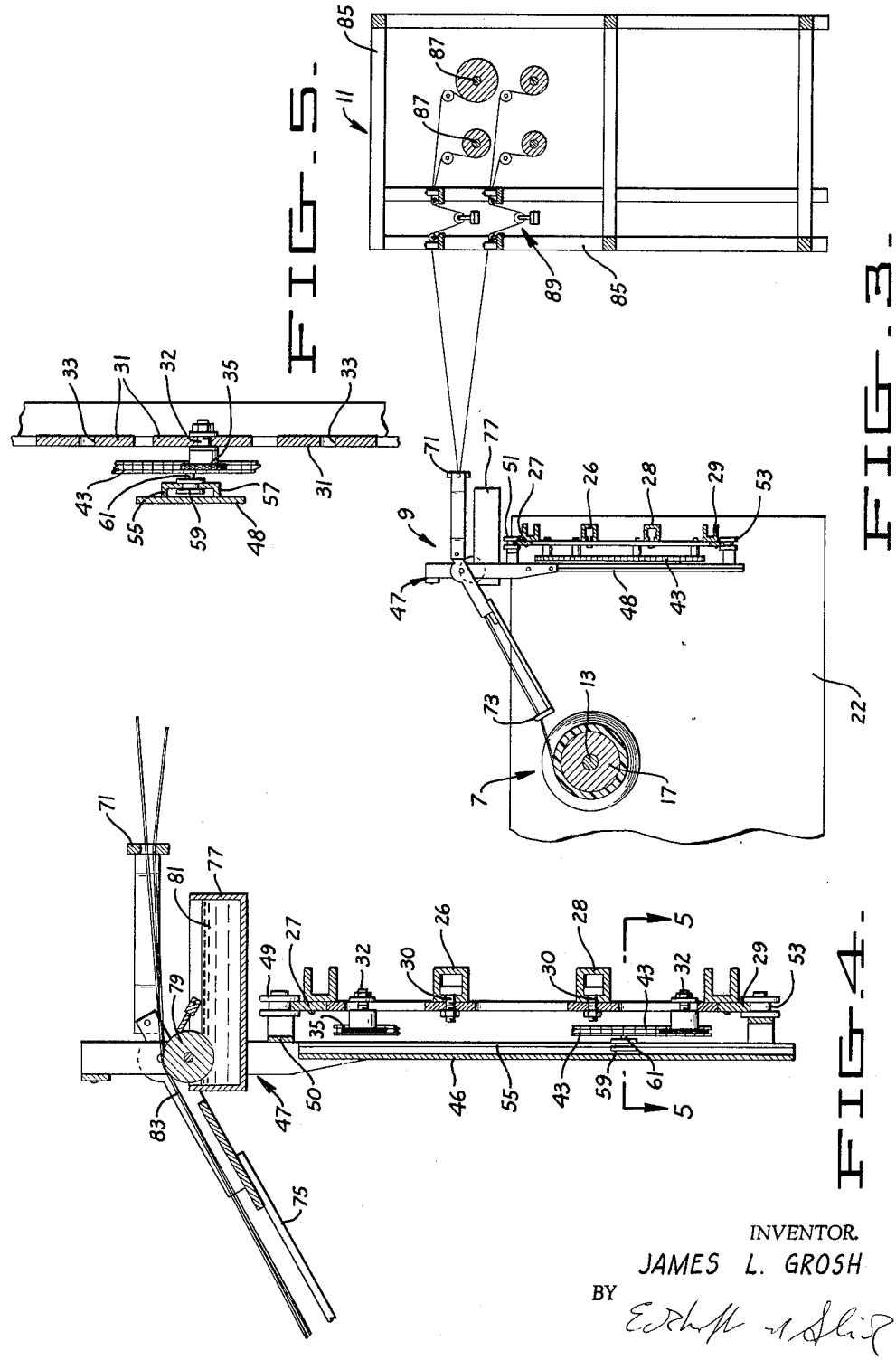

United States Patent Office 3,228,616
Patented Jan. 11, 1966

3,228,616
APPARATUS FOR CHANGING A HELICAL
WINDING ANGLE
James L. Grosh, Los Altos, Calif., assignor to United
Aircraft Corporation, East Hartford, Conn., a corporation of Delaware
Filed Dec. 26, 1962, Ser. No. 246,910
2 Claims. (Cl. 242—7)

This invention relates to a machine for winding a filament on an irregularly shaped article. Ordinarily when it is desired to wind a filament onto a form means are provided for winding the filament a predetermined, usually helical, pattern. Normally it is desired to wind each successive turn in close proximity to the preceding turn so that there will be no overlapping nor will there be a space between adjacent windings. The process is somewhat similar to the cutting of a thread on a lathe wherein the pitch or the winding angle is determined by the differential speed relationship between the rotating mandrel and the guide eyelet for the filament. If the article is one of regular shape such as a sphere or cylinder, the problem is quite simple and it is common to control the motion of an eyelet by means of a chain which passes over sprockets which are approximately in line with the ends of the mandrel so that as the mandrel is rotated the chain is driven, causing the eyelet to translate back and forth across the mandrel at a constant speed giving a constant winding angle.

It is frequently necessary to deviate from the straight cylindrical contour as for example when a straight cylindrical section terminates in a cone. As the filament traverses up the cone from the smaller cylindrical section, the surface speed relationship between the mandrel and eyelet changes, resulting in a change in winding angle. In order to keep the winding angle constant, it is necessary to speed up the longitudinal eyelet travel or slow down the mandrel rotation. In the past, this has been accomplished by using a selsyn motor or a hydraulic system coupling the mandrel drive and the eyelet cross speed mechanism with some programming mechanism for altering the relationship between the rotation and the eyelet travel. This has several disadvantages among them being the expense and complexity of the mechanism which involves either accurate cams or a complex tape programmer for controlling the relationship. Further, in such systems there is some inherent play or slack so that under the best of conditions perfect results are not obtained.

One application of the principles of the present invention is in the fabrication of rocket engine casings wherein glass fiber or similar filaments are wound over a removable mandrel while a thermosetting resin is applied to the filaments. After the winding operation is complete and the resin cured, the mandrel is removed leaving a lightweight but strong casing for a rocket motor. This is an extremely exacting application of the winding technique since such devices are ordinarily made of the lightest possible weight with a low safety margin. If the windings are inaccurate and overlap, excess weight and irregularities are produced in the casing while if the windings do not mate properly a weakened casing is produced which may fail in service. The invention will be described in connection with the fabrication of a rocket engine casing wherein glass filaments are coated with an epoxy resin but it will be understood to those skilled in the art that the invention is applicable to any situation wherein one wishes to provide a smooth winding over an irregularly shaped article.

It is therefore an object of the present invention to provide a winding device wherein a filamentary material can be wound over an irregularly shaped mandrel without the use of complex guidance or programming devices.

Another object of this invention is to provide a device for winding irregularly shaped articles which is easy to adjust and which has great flexibility so that one device is adaptable to the winding of articles of any configuration.

Other objects will be apparent from the specification which follows.

In the drawings forming a part of this application:
FIGURE 1 is a partial plan view of a device embodying the present invention.
FIGURE 2 is a front view, generally on the lines 2—2 of FIGURE 1 showing the mechanism for controlling the movement of the filament guide carriage.
FIGURE 3 is a sectional view on the lines 3—3 of FIGURE 1.
FIGURE 4 is an enlarged sectional view on the lines 4—4 of FIGURE 2.
FIGURE 5 is a sectional view on the lines 5—5 of FIGURE 4.

Referring now to the drawings by reference characters the device of the present invention includes a rotating mandrel assembly 7, a guide assembly 9 for guiding the material onto the mandrel and a supply mechanism generally designated 11 for supplying filamentary material. The mandrel assembly 7 comprises a shaft 13 adapted to be rotated by the drive mechanism 15, the shaft carrying a mandrel or form 17 on which filamentary material 19 is wound. The drive mechanism 15 includes a shaft 21 carrying a sprocket 23 for driving a chain 25, the chain 25 driving the guide means hereinafter described.

The guiding means includes side support members 22 and 24 with an upper rail 27 and a lower rail 29 held between them. Center rails 26 and 28 are also held by the supports. The center rails are U-shaped with inturned arms as is shown in FIGURE 4. The sprocket holders 31 comprise a series of vertical plates held to the center rails by bolts 30. The holders 31 have slots 33, slots 33 being adapted to hold a sprocket 35 in a desired location by means of the threaded shafts 32. Although a plurality of the holders 31 are shown in the drawing, only a single plate could be used to hold all of the sprockets but greater flexibility is achieved by making the members as a series of individually adjustable holders. A plurality of other sprockets such as those shown at 37, 39 and 41 are mounted on the framework and a chain 43 is trained around the various sprockets as is shown. Included is a master sprocket 45 which has a double set of teeth thereon, one set of which engage the chain 25 and the other the chain 43 so that the chain 43 is driven from the source 15.

A carriage 47 is mounted on the rail 27 and 29. Carriage 47 includes a center member 48 to which is attached a transverse member 50. At either end of the member 50 are the rollers 49 and 51 which support the carriage on the upper rail 27 and on the bottom end of the member 48 is a roller 53 which rolls on rail 29. Thus the carriage 47 is free to move back and forth over the rails 27 and 29. The member 48 has a pair of L-shaped brackets 55 and 57 which form a slot therebetween and a slider 59 is free to slide in the elongated opening thus formed. A pin 61 extends from one link on the chain 43 to the slider 59. Thus as the chain moves crosswise the carriage 47 will be carried along with the chain while if the chain moves horizontally the slider will merely move in the slot and there will be no sideways motion of the carriage 47.

If the chain moves at an angle the carriage will move sideways but at a speed much slower than the speed of this chain. Of course, the chain can double back on itself so that the motion of the carriage can be reversed at any point. These particular movements are shown by reference to FIGURE 2. Thus at the point marked 63 the chain is moving horizontally and the carriage 47 is moving at the same speed as the chain. At the point marked 65 the chain is moving at an angle so that the carriage is moving at somewhat less than half the speed of the chain. At the point marked 67 the chain has been given a reverse motion so that the carriage will move very slowly backward as compared with the direction it was traveling. At the point marked 69 the chain is traveling at right angles to the path of movement of the carriage so that although the chain is moving, the carriage 47 is standing still while the slider merely rides in its slot.

The carriage 47 includes two guides 71 and 73. Preferably guide 73 is held well out from the carriage by means of the support member 75 so that the filamentary material is guided onto the mandrel at exactly the desired point. The carriage may also include a tank 77 with a roller 79 therein which rotates within a plastic mixture 81, the roller 79 serving to coat the filamentary material 83 with liquid plastic as it passes through the guides.

The holder for the filamentary material comprises a framework 85 supporting a plurality of rolls 87 of a suitable filamentary material such glass fibers. Tensioning means as at 89 such as are well known to those skilled in the art are preferably employed to keep the filamentary material at a constant tension.

It will be understood that in order to secure the desired results, at least four sprockets carrying the chain must be employed since if only two or three were employed only a regular back and forth movement could be achieved. The sprockets are placed by experimentation in various predetermined positions with reference to a first axis which is parallel to member 28 and a second axis which is parallel to the long side of member 31 until the desired results are achieved. Although shown as being in adjustable slots and on adjustable members 31, it is obvious that in a machine wherein the entire production of the machine is to be devoted to the repeated manufacturing of a single article, it is not necessary to make the sprockets and their holders adjustable. However for short runs, and particularly for experimental purposes, it is preferred that both the sprockets and their supports be adjustable. It is obvious that to secure the desired results the mandrel and the guide chain must be driven in synchronism. In the embodiment shown, this is achieved by driving them from a common shaft 21.

Although the support for the sprockets is shown to be vertical, it is obvious that this support could be horizontal since the same translational motion would be imparted to the guide. Although it is preferable to use an endless chain, such as endless roller chain, it is also possible to use an endless belt and particularly a belt having teeth therein so that the belt can be driven in accurate synchronism without slippage.

I claim:

1. A device for winding a filament on a mandrel comprising in combination:
   (a) a supply of filamentary material;
   (b) a rotating mandrel, said filamentary material extending from said supply to said mandrel whereby the filamentary material is wound on the mandrel;
   (c) a guide between the source of filamentary material and the mandrel, said filamentary material passing through said guide;
   (d) said guide being mounted on a carrier for transverse movement parallel to the axis of rotation of the mandrel;
   (e) a holder located between said guide and said mandrel, a first axis of said holder being at substantially a right angle to said path of filamentary material extending through the guide and substantially parallel to the axis of the mandrel, and a second axis of said holder normal to the first axis being at right angles to said path of filamentary material and at substantially a right angle to the axis of said mandrel;
   (f) at least 4 sprockets mounted on said holder and an endless chain passing over said sprockets of which sprockets there is a first sprocket, a second sprocket, a third sprocket and a fourth sprocket in series as the chain passes over them;
   (g) a sliding connection between a point on said chain and said carrier whereby said carrier is moved by only transverse components of movements of the chain as said point makes a full cycle about said sprockets; and
   (h) driving means for rotating the mandrel and driving the chain in synchronism;
   (i) the fourth sprocket mounted in a fourth predetermined position with at least one point of contact between said chain and said sprocket on a first side of said second axis;
   (j) the first sprocket mounted in a first predetermined position with at least one point of contact between said chain and said sprocket on the second side of said second axis;
   (k) the second sprocket mounted in a second predetermined position with at least one point of contact between said chain and said sprocket on the first side of said second axis;
   (l) the third sprocket mounted in a third predetermined position with at least one point of contact between said chain and said sprocket on the second side of said second axis whereby a complete reversal of direction of travel of the guide and chain is carried out at an intermediate point located within the end limits of travel in either direction of the chain and the filament is, as a result of this reversal, laid in overlapping relationship upon itself at intermediate points on the mandrel.

2. A device for winding a filament on a mandrel comprising in combination:
   (a) a supply of filamentary material;
   (b) a rotating mandrel, said filamentary material extending from said supply to said mandrel whereby the filamentary material is wound on the mandrel;
   (c) a guide between the source of filamentary material and the mandrel, said filamentary material passing through said guide;
   (d) said guide being mounted on a carrier for transverse movement parallel to the axis of rotation of the mandrel;
   (e) a holder located between said guide and said mandrel a first axis of said holder being at substantially a right angle to said path of filamentary material extending through the guide and substantially parallel to the axis of the mandrel, and a second axis of said holder normal to the first axis being at right angles to said path of filamentary material and at substantially a right angle to the axis of said mandrel;
   (f) at least four sprockets mounted on said holder and an endless chain passing over said sprockets of which sprockets there is a first sprocket, a second sprocket and a third sprocket in series as the chain passes over them;
   (g) a sliding connection between a point on said chain and said carrier whereby said carrier is moved by only transverse components of movements of the chain as said point makes a full cycle about said sprockets;
   (h) driving means for rotating the mandrel and driving the chain in synchronism;
   (i) the fourth sprocket mounted in a fourth predetermined position with at least one point of contact between said chain and said sprocket on a first side of said second axis;
(j) the first sprocket mounted in a first predetermined position with at least one point of contact between said chain and said sprocket on the second side of said second axis;
(k) the second sprocket mounted in a second predetermined position with at least one point of contact between said chain and said sprocket on the first side of said second axis;
(l) the third sprocket mounted in a third predetermined position with at least one point of contact between said chain and said sprocket on the second side of said second axis whereby a complete reversal of direction of travel of the guide and chain is carried out at an intermediate point located within the end limits of travel in either direction of the chain and the filament is, as a result of this reversal, laid in overlapping relationship upon itself at intermediate points on the mandrel; and
(m) said holder comprising a frame member having a plurality of transversely adjustable holders mounted thereon, each of said holders having horizontal slots therein and means whereby said holders can be mounted and held to said frame in any desired position and means whereby said sprockets can be positioned along said slots.

References Cited by the Examiner

UNITED STATES PATENTS

| | | | |
|---|---|---|---|
| 3,106,504 | 10/1963 | Carter | 242—7 |
| 3,112,895 | 12/1963 | Kinney | 242—7 |

FOREIGN PATENTS

| | | |
|---|---|---|
| 851,171 | 10/1952 | Germany. |
| 883,871 | 7/1953 | Germany. |
| 865,994 | 4/1961 | Great Britain. |

MERVIN STEIN, *Primary Examiner.*

DONALD W. PARKER, *Examiner.*